UNITED STATES PATENT OFFICE.

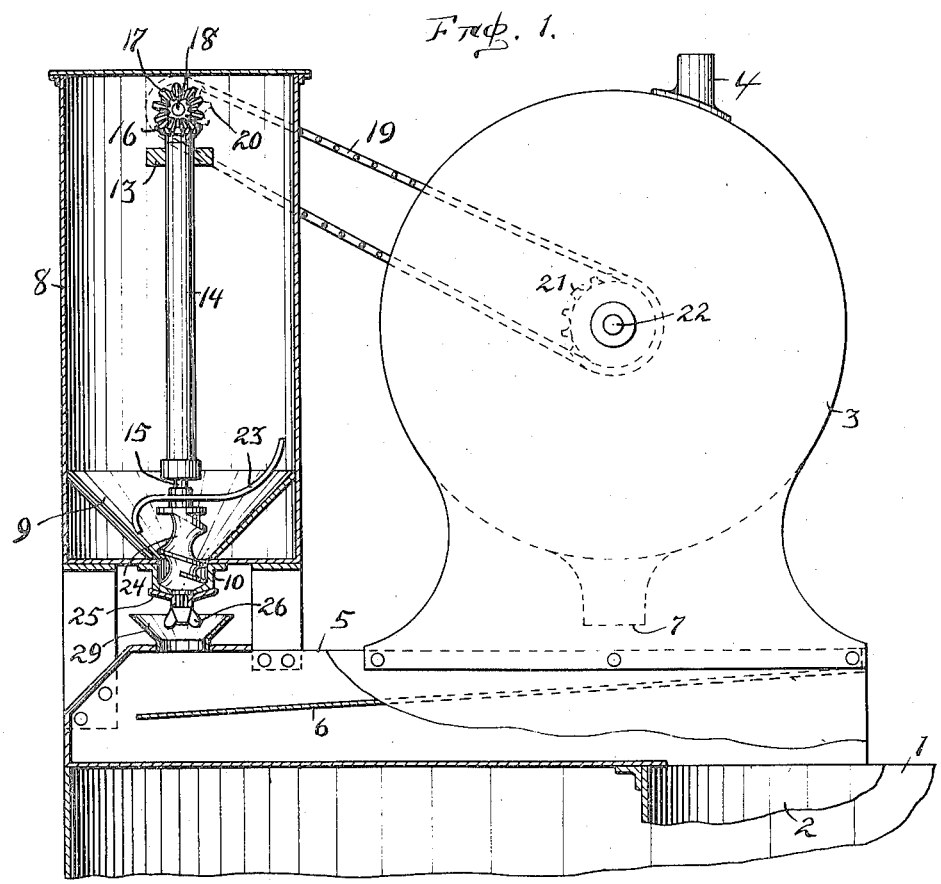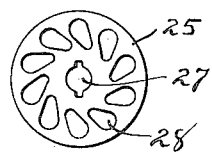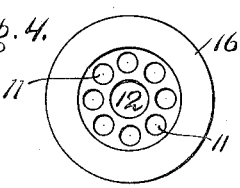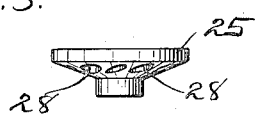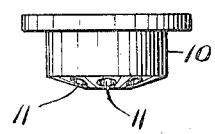

WALTER WARRINER, OF FORT WAYNE, INDIANA, ASSIGNOR OF ONE-HALF TO JOHN M. KUHNS AND HERBERT W. BOND, BOTH OF FORT WAYNE, INDIANA.

FEEDER FOR WATER-SOFTENING PLANTS.

1,208,058.                        Specification of Letters Patent.        Patented Dec. 12, 1916.

Application filed January 8, 1916. Serial No. 70,956.

*To all whom it may concern:*

Be it known that I, WALTER WARRINER, a citizen of the United States of America, and resident of Fort Wayne, in the county of Allen and State of Indiana, have invented certain new and useful Improvements in Feeders for Water-Softening Plants, of which the following is a specification.

This invention relates to improvements in feeders for water softening plants of that character wherein a chemical is introduced into a tank of water in proportionate quantity with the water entering the tank, and the object thereof is to afford an apparatus for feeding a pulverulent chemical or composition of chemicals to the supply of water as it enters the tank at a definite quantitive ratio and to so construct the device as to prevent caking of the pulverulent material at the point of its discharge into the water that usually occurs owing to the gases and moisture that arise from the water upon its introduction thereinto which have a tendency to foul the feeding apparatus because of the absorbing tendency of the pulverulent chemical that is ordinarily used for purposes of the kind.

The object of the invention is accomplished by the construction illustrated in the accompanying drawings in which:

Figure 1 is a side elevation of the apparatus and appurtenances, a portion thereof shown in vertical section; Fig. 2 is a plan view of a perforated revolving discharge member; Fig. 3 is a side view of the same; Fig. 4 is a plan view of the discharge nozzle; and Fig. 5 is a side view of the same.

Similar characters of reference indicate corresponding parts throughout the several views and referring now to the same: 1 is a treating tank of the usual type employed in water softening plants and (2) is the central chamber thereof through which the water is introduced into the tank. 3 is a water-wheel, and (4) is the port through which water is applied to the water-wheel. The water-wheel is mounted upon a chute (5), and (6) is a longitudinal partition in the chute that has inclination toward one end thereof so that water discharged from the outlet (7) of the water-wheel will flow toward the corresponding end of the chute. The partition terminates at its lower end a short distance from the outer end of the chute so that the water passing from the water-wheel and flowing from the partition will continue its flow through the lower part of the chute and become discharged into the central chamber (2). Over the outer end of the chute is mounted a feed-hopper (8) having at its lower portion a conical bottom (9), the lower end of which has communication with a cup-shaped discharge nozzle (10). The lower end of the discharge nozzle is slightly conical and has extending therethrough a series of discharge openings (11) and also a central opening (12). A transverse brace (13) is fixed within the upper portion of the hopper and a pendant tube (14) is fixed to the brace and extends vertically at the center of the hopper in line with the central opening in the nozzle. A shaft (15) extends through the tube and has fixed upon its upper end a pinion (16) that meshes with a driving pinion (17) that is fixed upon a drive-shaft (18), the latter extending into the hopper horizontally and which is actuated by means of a chain (19) that is trained upon sprocket-wheels (20) and (21), the former being fixed upon the drive-shaft (18) and the latter upon the shaft (22) of the water-wheel.

Upon the shaft (15) adjacent the lower end of the tube and extending within the conical bottom (9) is an agitator (23) adapted to rotate with the shaft, and upon the lower end of the shaft (15) is fixed a spiral feeder (24) the lower end of which extends into the nozzle (10). The lower end of the shaft (15) extends through the central opening (12) in the nozzle and has fixed thereon a discharge member (25), the same being held in place by means of a thumb-nut (26). The discharge member has a notched central opening (27) for the reception of the end of the shaft which is correspondingly shaped so that the discharge member will revolve with the shaft. An annular series of openings (28) extend through the discharge member and are adapted to pass the openings (11) in the bottom of the nozzle as the former is rotated. When the nut (26) is properly adjusted the discharge member is held snugly against the lower end of the nozzle.

Immediately beneath the discharge member is a funnel (29) adapted to receive the discharge therefrom and direct the same into the chute (5) at a point directly over the partition (6) near its outer end.

In the operation of the invention the pulverulent water softening chemical of the character usually employed is placed in the feed-hopper and the water to be treated is introduced through the port (4) so that the water-wheel becomes actuated thereby and its shaft (22) rotated more or less according to the volume of water introduced, the water thus passing being discharged from the outlet (7) into the chute wherein it flows over the partition (6) beneath the funnel and from thence beneath the partition into the central chamber (2) of the treating tank. As the shaft (22) revolves continuous motion is transmitted to the shaft (15) through the medium of the chain (19), shaft (18) and gears (17) and (16) thus causing the agitator (23), spiral feeder (24) and discharge member (25) to likewise revolve. The chemical within the hopper is kept constantly in a loose form in the bottom of the hopper by the rotation of the agitator (23) and is pressed by the action of the spiral feeder into the nozzle through which it finally passes and the discharge member is rotated. The chemical thus discharged flows through the funnel into the flowing water in the chute and passes therewith into the treating tank.

By means of the construction herein disclosed the chemical becomes uniformly fed into the water proportionate with the flow thereof, and should the chemical become moistened or otherwise affected by dampness or caked from the effect of gases so as to tend to clog, the passage of the chemical through the apparatus will not become interrupted inasmuch as the chemical is forced by the feeder into the nozzle and even though should it become caked the action of the discharge member continually wears away the caked particles and frees the openings of the nozzle.

What I claim is:—

In apparatus of the class described, a water-wheel having inlet and discharge openings, a chute adapted to receive the discharge from the water-wheel, a feed-hopper having a nozzle adapted to discharge into the chute, a rotating shaft within the hopper, motion transmitting mechanism in connection with the water-wheel and shaft for actuating the latter, an agitator fixed on the shaft within the lower portion of the hopper, a spiral feeder extending into the nozzle and adapted to be actuated by the shaft, and a revolving discharge member bearing against the outer end of the nozzle.

In testimony whereof I affix my signature in the presence of two witnesses.

WALTER WARRINER.

Witnesses:
 MATHILDA METTLER,
 SOPHIA HEINE.